United States Patent Office 2,829,147
Patented Apr. 1, 1958

2,829,147

PRODUCTION OF HALOGENATED COMPOUNDS

Hyman M. Molotsky and Edward G. Ballweber, Chicago, Ill., assignors to Velsicol Chemical Corporation, Chicago, Ill., a corporation of Illinois No Drawing. Application January 8, 1957
Serial No. 632,973

11 Claims. (Cl. 260—343.2)

This invention relates to the preparation of halogenated compositions of matter. In particular, the present invention relates to the molecular oxygen oxidation of 1,2,3,4,7,7-hexachlorobicyclo-2.2.1)-2,5 heptadiene.

United States Patent No. 2,736,730, entitled "Epoxy-Polychloro-Bicyclo (2.2.1) Heptene" claims as a new composition of matter 5,6-epoxy-1,2,3,4,7,7-hexachlorobicyclo-(2.2.1)-2-heptene and describes the preparation of this highly valuable composition of matter by the reaction of 1,2,3,4,7,7-hexachlorobicyclo-(2.2.1)-2,5-heptadiene and peracetic acid in the presence of sodium acetate, using acetic acid as a solvent. While this process is operable, it would be highly desirable to devise a process for the production of this highly valuable composition which utilizes a minimum of expensive raw materials and equipment. It is of further interest to prepare new compositions of matter containing the combination of the halogenated cyclic ring, a carbonyl group and a hydroxy or lactone linkage, said compounds having utility as insecticides and herbicides, as intermediates in the preparation of valuable halogenated acids, and also useful in the preparation of resins, lubricating oils, dyestuffs, perfumes and the like.

It is therefore an object of the present invention to devise a new method for the preparation of 5,6-epoxy-1,2,3,4,7,7-hexachlorobicyclo-(2.2.1)-2-heptene.

Another object of the present invention is the preparation of new halogenated compositions of matter.

Still another object of the present invention is the preparation of new oxygen-containing compositions of matter.

Still another object of the present invention is a new process for the conversion by means of oxygenation of halogenated bicyclic compositions of matter into valuable oxygen-containing compositions of matter.

Still other objects of the present invention will become apparent from the ensuing description of the present invention.

Broadly, the present invention involves the contacting of 1,2,3,4,7,7-hexachlorobicyclo-(2.2.1)-2,5-heptadiene with molecular oxygen at an elevated temperature and recovering as the major products thereof the aforementioned 5,6-epoxy-1,2,3,4,7,7-hexachlorobicyclo-(2.2.1)-2-heptene, and two new and valuable compositions 1,2,3,4,7,7 - hexachloro - 5 - keto - 6 - hydroxy - bicyclo - (2.2.1) - 2-heptene and 3,4,5,6,8,8-hexachloro-2-keto-3,6-methano-oxacycloheptene-4, the latter two compositions being isomers of each other.

This novel reaction is quite unexpected in view of the fact that the starting material is quite stable at the temperatures utilized in the process of the present invention. McBee in J. A. C. S., volume 77, page 4942 (1955), states: "It should be noted that extensive halogen substitution generally decreases the reactivity of the diene system." Consequently, it is quite unexpected that this relatively stable composition should react with molecular oxygen under the present conditions to produce valuable compositions which contain the same number of carbon and halogen atoms as the starting material, contain cyclic configurations as does the starting material and, in addition, the oxygen atoms.

The new compositions prepared from this unique process have the following structures:

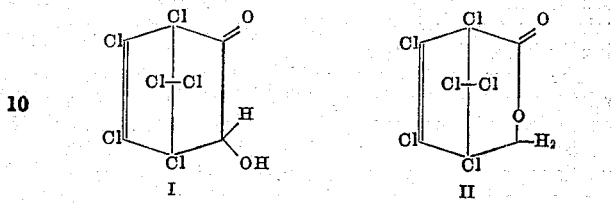

I
1,2,3,4,7,7-hexachloro-5-keto-6-hydroxy-bicyclo-(2.2.1)-2-heptene

II
3,4,5,6,8,8-hexachloro-2-keto-3,6-methano-oxacycloheptene-4 and hereinafter will be referred to as I and II, respectively.

These new compositions have a multiplicity of uses, being highly valuable as agricultural and industrial chemicals in addition to being intermediates in the preparation of highly useful hydroxy acids and hydroxy acid chlorides. Two highly valuable compositions which are preparable from the new compositions of the present invention have the following structures:

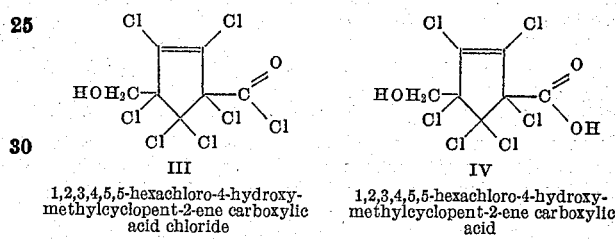

III
1,2,3,4,5,5-hexachloro-4-hydroxy-methylcyclopent-2-ene carboxylic acid chloride IV
1,2,3,4,5,5-hexachloro-4-hydroxy-methylcyclopent-2-ene carboxylic acid hereinafter referred to as compounds III and IV.

Compound III can be prepared from compound II, obtained from the process of the present invention by reacting compound II with hydrochloric acid at elevated temperatures such as 100° C.–200° C. Compound III in turn may be used to prepare compound IV by hydrolysis in an alkaline solution. Compound III forms a valuable resin on heating. This simple thermal polymerization emphasizes the versatility of these new compounds. Compound IV, possessing an hydroxy group in addition to being highly halogenated, and further having a carboxyl group, is extremely useful in the preparation of polymers, as well as being a superior plant regulator. Since compounds I and II are now readily obtainable because of the present invention, many new compounds with varied utility, such as those previously described, i. e. III and IV, will now be obtainable. Thus, the process of the present invention not only prepares a composition already known to be valuable, but it also produces new compositions of matter which have multifold utility. Further, inasmuch as the three major component products produced by this novel process have combined superior properties beneficial in the cultivation of agricultural products, the combined reaction product itself is a highly useful material.

As previously indicated, the sole reactants are molecular oxygen and 1,2,3,4,7,7-hexachlorobicyclo-(2.2.1)-2,5-heptadiene. Example 1 of United States Patent 2,736,730 describes a method for preparing this heptadiene starting material. Consequently, its preparation will not be herein repeated. However, it is to be remembered that the starting material may be prepared by other methods. The method of preparing the starting material for the present process is, of course, not critical to the present process.

While the use of substantially pure oxygen is preferred, various diluents, such as nitrogen, may be used. Ordinary air can be used in the present process, and the use of air will only prolong the reaction and rate of conversion, since it contains only about 20% oxygen and the remainder inert materials.

The mode of reacting molecular oxygen with the liquid chlorinated hydrocarbon is preferably to introduce it as a gas below the surface of the liquid hydrocarbon in a steady stream. Since the reaction rate is dependent in part upon the rate and extent of contact with oxygen, it is recommended that the oxygen be introduced by the use of sintered glass or porous orifices which will maintain the oxygen in a highly divided state, thereby increasing the interfacial area of contact.

The temperature of the reaction may vary, but generally temperatures from about 30° C. to about 155° C. are operable, and temperatures from about 75–150° C. are preferred. The reaction may be conveniently run in conventional apparatus, and since pressure is not a critical factor, the apparatus may be open to the atmosphere. The process of the present invention can also be run as a continuous process by passing the gaseous oxygen countercurrently through a moving bed of the liquid 1,2,3,4,7,7-hexachlorobicyclo-(2.2.1)-2,5-heptadiene. While the reaction is operable without pressure limitations, as is usual when reacting a gas with a liquid, the use of superatmospheric pressures from atmospheric up to about 200 pounds per square inch or higher, depending on the ability of the reactor to withstand pressure, is advantageous in that it allows for better contact of the starting material and oxygen.

In addition, the use of ultraviolet light and chlorine gas are valuable catalysts in the process of the present invention, although not necessary to its success. By exposing the reaction mixture to actinic radiation, e. g., the light from a mercury vapor lamp, especially during the early stages of the reaction, side reactions can be minimized and the reaction rate appreciably increased. Similar advantages are obtained when catalytic amounts of chlorine gas are mixed into the stream of oxygen gas. The use of these or other catalysts is desirable, but is not a requirement for the oxidation of 1,2,3,4,7,7-hexachlorobicyclo-(2.2.1)-2,5-heptadiene in accordance with the present invention.

The rate of oxygen influx will depend upon several factors, among which are the temperature of the reaction, the size of the oxygen bubbles, and the length of contact time. Another factor which may affect the reaction is the purity of the oxygen reactant. Thus while the use of substantially pure gaseous oxygen is preferred, various diluents, such as nitrogen, may be used. A practical rate of oxygen influx should be above about 100 cubic centimeters (cc.) per minute per mole of 1,2,3,4,7,7-hexachlorobicyclo-(2.2.1)-2,5-heptadiene, and a preferred rate of oxygen influx is between about 800 and 2000 cc. per minute per mole. It should be understood that these rates apply to the pure oxygen reactant, and where oxygen is used in a dilute form, as by the use of air, the total quantity of gas used will be proportionately greater. Lesser or greater rates may be used with the process still being operable, since only the rate of reaction is affected.

While a preferred procedure in the process of the present invention is to react the starting material with gaseous oxygen in the absence of solvent, the use of solvents is not detrimental to the present process. Such solvents should preferably be inert to gaseous oxygen and to the products of the present invention. The use of specific solvents may be desirable in controlling the temperature of the reaction so as to prevent it from rising above 160° C. at which temperature other competing reactions may take place. Thus, for example, by using xylene as a solvent, a temperature in the range of 140–150° C. is readily maintainable by using reflux conditions.

The time of reaction will vary with such factors as the temperature at which the reaction is carried out, the area of contact, the contact time, and the rate of oxygen throughput. Generally, it may be stated that satisfactory yields will be obtained in periods of time ranging upward from about two hours.

The process of the present invention is highly unusual and unexpected in view of the fact that 1,2,3,4,7,7-hexachlorobicyclo-(2.2.1)-2,5-heptadiene is considered extremely stable at the temperature range utilized in this new process, and that while the process prepares highly valuable compositions of matter, it does not destroy the halogenated bicyclic ring structure of the starting material, but rather modifies it to an oxygenated form.

The following examples illustrate the process of the present invention:

Example I

Into a 1,000 cc. three-necked flask equipped with thermometer, a sparger, and stirrer were placed 1,2,3,4,7,7-hexachlorobicyclo-(2.2.1)-2,5-heptadiene (900 grams) heated to about 35° C.–40° C. Oxygen was passed through the sparger which extended below the surface of the liquid and bubbled through the heated reactant at a rate of 1500 cc. per mol of reactant per minute with stirring. The heating and oxygen were continued for 130 hours, with samples being withdrawn every 24 hours. At the end of 24 hours, 40% of the starting material had been reacted; at the end of 48 hours, 66% had been reacted; at the end of 96 hours, 91%; and at the completion of 130 hours, 97% of the 1,2,3,4,7,7-hexachlorobicyclo-(2.2.1)-2,5-heptadiene had been reacted. A chromatographic separation of the reaction products yielded two fractions. The first representing a yield of 30% was identified as 5,6-epoxy-1,2,3,4,7,7-hexachlorobicyclo-(2.2.1)-2-heptene. It was identified by infrared and elemental analysis which showed it to be the same as that produced in Example II of United States Patent 2,736,730.

The second major fraction was obtained by fractional distillation as the fraction with a boiling point of 144–146° C. per 1 mm. Hg. It represented a yield of approximately 55% and was analyzed for $C_7H_2Cl_6O_2$:

|  | C | H | Cl |
|---|---|---|---|
| Theoretical | 25.41 | 0.61 | 64.31 |
| Found | 25.37 | 0.65 | 64.41 |

Further analysis showed it to contain two isomers, namely, 3,4,5,6,8,8-hexachloro-2-keto-3,6-methano oxacycloheptene-4 and 1,2,3,4,7,7-hexachloro-5-keto-6-hydroxybicyclo-(2.2.1)-2-heptene, having a refractive index at $N_D^{20}$ of 1.5852.

Example II

A duplication of Example I was performed modifying only the oxygen rate which was slowed to 150 cc. per mol of 1,2,3,4,7,7-hexachlorobicyclo-(2.2.1)-2,5-heptadiene per minute. It took 310 hours to obtain a yield comparable to that obtained in 130 hours at conditions described in Example I, that is, 97% conversion of the heptadiene and a 30% yield of the epoxide.

Example III

A third experiment was performed again using the conditions and methods described in Example I modifying only the reaction temperature, this reaction being performed at a temperature of 75–85° C. At 52 hours of reaction, analysis showed a 96% conversion of the heptadiene and a 25% yield of the epoxide.

Example IV

A fourth reaction was performed similar to that described in Example I, but at a temperature of 140–150° C. At the end of four hours of reaction, the percent conversion of the heptadiene was 60 and the epoxide yield was approximately 15%; at the end of seventeen hours the percent conversion was 96 and the epoxide yield about 35%.

As shown by these examples, the process of the present invention is operable in a fairly wide range of temperatures. While these experiments were performed in the absence of catalytic materials, as previously stated, certain catalysts will be helpful in producing higher yields at lower temperatures and also permitting the use of relatively dilute oxygen, i. e., air, without decreasing the quantity or quality of the product. Then, too, while the experiments shown used relatively low oxygen rates, higher flow will reduce the reaction time appreciably. Also, special baffled equipment designed to increase the contact between the reactants will immeasurably increase the proficiency of the process. Thus, the above examples should not be construed as limiting the scope of the process of the present invention.

One of the many outstanding features of the present process is the elimination of the requirement of special equipment necessary in most ordinary oxidations which use such hard-to-handle reactants as sulphuric acid, peracetic acid, etc. The cost of such equipment is in many instances prohibitive. Also, the present process utilizes relatively inexpensive molecular oxygen and can actually use ordinary atmospheric air. Then, too, the present oxidation process, while it results in highly valuable compositions also does not destroy the halogenated cyclic characteristic of the starting material. Thus, it is a sufficient oxidation to oxidize 1,2,3,4,7,7 - hexachlorobicyclo-(2.2.1)-2,5-heptadiene, yet not so severe as to completely destroy the aforementioned portion of the starting material.

We claim:

1. A process which comprises intimately contacting 1,2,3,4,7,7-hexachlorobicyclo (2.2.1)-2,5-heptadiene with oxygen at a temperature between about 30° C. and about 155° C.

2. A process for the oxidation of 1,2,3,4,7,7-hexachlorobicyclo (2.2.1)-2,5-heptadiene which comprises reacting 1,2,3,4,7,7-hexachlorobicyclo (2.2.1)-2,5-heptadiene with oxygen at a temperature between about 75° C. and about 150° C.

3. A process which comprises passing oxygen through 1,2,3,4,7,7-hexachlorobicyclo (2.2.1)-2,5-heptadiene at a temperature between about 30° C. and about 155° C. in the presence of ultraviolet radiation.

4. A process for the oxidation of 1,2,3,4,7,7-hexachlorobicyclo (2.2.1)-2,5-heptadiene which comprises heating a mixture of 1,2,3,4,7,7 -hexachlorobicyclo (2.2.1)-2,5-heptadiene and oxygen at a temperature between about 30° C. and about 155° C. in the presence of chlorine.

5. A process which comprises passing gaseous oxygen through 1,2,3,4,7,7-hexachlorobicyclo (2.2.1)-2,5-heptadiene at a rate of at least 100 cc. per minute per mol of 1,2,3,4,7,7 - hexachlorobicyclo-(2.2.1)-2,5-heptadiene at a temperature between about 30° C. and about 155° C. under pressure from about atmospheric to about 200 pounds per square inch.

6. A process for producing 5,6-epoxy-1,2,3,4,7,7-hexachlorobicyclo-(2.2.1)-2-heptene which comprises passing gaseous oxygen through 1,2,3,4,7,7-hexachlorobicyclo-(2.2.1)-2,5-heptadiene at a rate of at least 100 cc. per minute per mol of 1,2,3,4,7,7-hexachlorobicyclo-(2.2.1)-2,5-heptadiene at a temperature between about 30° C. and about 155° C. under pressure from about atmospheric to about 200 pounds per square inch.

7. A process for producing 1,2,3,4,7,7-hexachloro-5-keto - 6 - hydroxy-bicyclo-(2.2.1)-2-heptene which comprises passing gaseous oxygen through 1,2,3,4,7,7-hexachlorobicyclo-(2.2.1)-2,5-heptadiene at a rate of at least 100 cc. per minute per mol of 1,2,3,4,7,7-hexachlorobicyclo-(2.2.1)-2,5-heptadiene at a temperature between about 30° C. and about 155° C. under pressure from about atmospheric to about 200 pounds per square inch.

8. A process for producing 3,4,5,6,8,8-hexachloro-2 keto - 3,6 - methano-oxacycloheptene-4 which comprises passing gaseous oxygen through 1,2,3,4,7,7-hexachlorobicyclo-(2.2.1)-2,5-heptadiene at a rate of at least 100 cc. per minute per mol of 1,2,3,4,7,7-hexachlorobicyclo-(2.2.1)-2,5-heptadiene at a temperature between about 30° C. and about 155° C. under pressure from about atmospheric to about 200 pounds per square inch.

9. As a new composition of matter a compound selected from the group consisting of 1,2,3,4,7,7-hexachloro-5-keto-6-hydroxy-bicyclo-(2.2.1)-2-heptene and 3,4,5,6,8,-8-hexachloro-2-keto-3,6 methano-oxacycloheptene-4.

10. 1,2,3,4,7,7 - hexachloro-5-keto-6-hydroxy - bicyclo-(2.2.1)-heptene.

11. 3,4,5,6,8,8 - hexachloro-2-keto-3,6-methano - oxacycloheptene-4.

No references cited.